US011386201B2

United States Patent
Oberman

(10) Patent No.: US 11,386,201 B2
(45) Date of Patent: Jul. 12, 2022

(54) DATA BUS PROTECTION DEVICE AND METHOD

(71) Applicant: C2A-SEC, Ltd., Jerusalem (IL)

(72) Inventor: Shlomo Oberman, Jerusalem (IL)

(73) Assignee: C2A-SEC, Ltd., Jerusalem (IL)

( * ) Notice: Subject to any disclaimer, the term of this patent is extended or adjusted under 35 U.S.C. 154(b) by 640 days.

(21) Appl. No.: 16/321,029

(22) PCT Filed: Aug. 6, 2017

(86) PCT No.: PCT/IL2017/050868
§ 371 (c)(1),
(2) Date: Jan. 27, 2019

(87) PCT Pub. No.: WO2018/037397
PCT Pub. Date: Mar. 1, 2018

(65) Prior Publication Data
US 2019/0171813 A1      Jun. 6, 2019

Related U.S. Application Data

(60) Provisional application No. 62/378,407, filed on Aug. 23, 2016.

(51) Int. Cl.
*G06F 21/00* (2013.01)
*G06F 21/55* (2013.01)
(Continued)

(52) U.S. Cl.
CPC .............. *G06F 21/55* (2013.01); *G06F 21/50* (2013.01); *H04L 9/3226* (2013.01);
(Continued)

(58) Field of Classification Search
CPC ....... G06F 21/50; G06F 21/55; H04L 9/3226; H04L 12/40013; H04L 63/1425
See application file for complete search history.

(56) References Cited

U.S. PATENT DOCUMENTS

2012/0124374 A1   5/2012  Murray
2013/0124767 A1   5/2013  Prasadh
(Continued)

FOREIGN PATENT DOCUMENTS

| CN | 103297266 A | 9/2013 |
|---|---|---|
| CN | 105141579 A | 12/2015 |
| CN | 105553946 A | 4/2016 |

OTHER PUBLICATIONS

International Search Report for PCT/IL2017/050868 issued by European Patent Office dated Dec. 12, 2017.
(Continued)

*Primary Examiner* — Jeffrey C Pwu
*Assistant Examiner* — Thong P Truong
(74) *Attorney, Agent, or Firm* — Webb and Co., Ltd.

(57) ABSTRACT

A bus control device is enabled for placement between an input port to which a suspect device would be connected and the bus. In this manner, all message received from the suspect device, such an infotainment system, must pass through the bus control device. A separate intrusion detection device is coupled to the bus. The bus control device is arranged to output a notification message to the intrusion detection device, the notification message comprising information about the received message. The intrusion detection device is arranged to determine the validity of the received message responsive to the received notification message.

16 Claims, 8 Drawing Sheets

(51) Int. Cl.
    *H04L 12/40*    (2006.01)
    *H04L 9/40*     (2022.01)
    *H04L 9/32*     (2006.01)
    *G06F 21/50*    (2013.01)
    *H04L 67/12*        (2022.01)
    *G05B 19/418*       (2006.01)

(52) U.S. Cl.
    CPC .... *H04L 12/40013* (2013.01); *H04L 63/1425* (2013.01); *G05B 19/4185* (2013.01); *H04L 67/12* (2013.01); *H04L 2012/40215* (2013.01); *H04L 2209/84* (2013.01)

(56) References Cited

U.S. PATENT DOCUMENTS

| | | |
|---|---|---|
| 2014/0195808 A1 | 7/2014 | Lortz et al. |
| 2015/0020152 A1 | 1/2015 | Litichever et al. |
| 2015/0052405 A1 | 2/2015 | Maiolani et al. |
| 2015/0113638 A1 | 4/2015 | Valasek et al. |
| 2015/0191135 A1* | 7/2015 | Ben Noon .......... H04L 63/1408 726/22 |
| 2016/0021127 A1 | 1/2016 | Yan et al. |

OTHER PUBLICATIONS

Written Opinion of the International Searching Authority for PCT/IL2017/050868 issued by European Patent Office dated Dec. 12, 2017.

\* cited by examiner

DATA BUS PROTECTION DEVICE AND METHOD

TECHNICAL FIELD

The invention relates generally to the field of security devices, and more specifically a system and method for providing protection for devices on a common data bus.

BACKGROUND

The number of electronic devices being installed in vehicles is rapidly increasing. In the past, electronic devices in automobiles were discrete devices handling a particular function, operating in a stand-alone environment. In the 1980's it was recognized that there would be a need to develop a network operating standard for vehicles, and the controller area network (CAN) bus was born.

Over time the number of interconnected devices utilizing a CAN bus has rapidly increased. These interconnected devices may control driving features, such as engine speed, braking control and steering control, as well as comfort features such as lighting, windows and sun-roof controls.

A further development has been the expansion of the Internet, and the ever growing demand for wireless access to the Internet. The expansion of cellular telephones and wireless Internet access ensures that in the future vehicles will be connected to external networks. In the recent past access to the vehicle was restricted to the use of a dedicated service cable, and the only wireless access for a radio delivering news and music, today an integrated infotainment system is being provided that delivers to the vehicle both entertainment and information content.

Integrated the infotainment system into the CAN bus leads to particular challenges, which have never been faced before in vehicle situations—hackers can take control of the integrated vehicle using the infotainment portal. As automatically driven vehicles are rapidly making inroads, this threat is becoming increasingly acute.

Various solutions have been offered, such as bus monitors, however the solutions to date have not been satisfactory, primarily because the nature of the CAN bus does not provide for source information in bus messages. Thus, once a message appears on the CAN bus there is no information available as to the source of that message. It is not possible therefore to instruct the electronic steering module to ignore all messages from the infotainment system, since the electronic steering module simply has no way to identify the source of the messages which it is receiving. Furthermore, the CAN bus architecture and software is well established and can not be easily changed.

SUMMARY OF THE INVENTION

Accordingly, it is a principal object of the present invention to overcome at least some of the disadvantages of prior art bus control methods and systems. This is provided in one embodiment by providing a bus control device between an input port to which a suspect device would be connected and the bus. In this manner, all message received from the suspect device, such an infotainment system, must pass through the bus control device. A separate intrusion detection device is coupled to the bus. The bus control device is arranged to output a notification message to the intrusion detection device, the notification message comprising information about the received message. The intrusion detection device is arranged to determine the validity of the received message responsive to the received notification message.

In one embodiment, the bus control device is further arranged to change at least one bit of the received message to create the notification message. In one further embodiment, the one bit is changed in an identification field of the received message. In another further embodiment, the notification message contains sufficient information such that in the event the intrusion detection device determine that the received message is valid, the intrusion detection device is arranged to recreate the received message from the received notification message and output the recreated received message on the common bus.

In one embodiment, the bus control device is further arranged to output the received message onto the common bus. In another embodiment, the bus control device is arranged to alternately operate in one of a detection mode and a prevention mode, responsive to a received control signal, wherein in the detection mode the bus control device is arranged to output the received message onto the common bus and in the prevention mode the bus control device is arranged to not output the received message.

In one embodiment, the bus control device is arranged to output the notification message onto the common bus. In another embodiment, the system further comprises a secure data connection between the bus control device and the intrusion detection device separate from the common bus, wherein the bus control device is arranged to output the notification message to the intrusion detection device via the secure data connection.

In one further embodiment, in the prevention mode, the intrusion detection device is arranged to reconstruct the received message based on the notification message and output the reconstructed received message onto the common bus. In another embodiment, the bus control device comprises: a first and a second transceiver; a message handler, each of the first and the second transceivers responsive to the message handler, a receive port of the first transceiver coupled to the input port, a transmit port of the second transceiver coupled to the common bus, a transmit port of the first transceiver coupled to a receive port of the second transceiver, wherein the message handler is arranged to create the notification message.

In one further embodiment, the bus control device is arranged to output the notification message onto the common bus, and wherein the message handler further comprises a feedback suppression circuit arranged to suppress feedback of the output notification message. In another further embodiment, the system further comprises a third transceiver, the receive port of the third transceiver coupled to the transmit port of the first transceiver, wherein the transmit port of the third transceiver is coupled to the common bus.

In one further embodiment, the system further comprises a third transceiver, the receive port of the third transceiver coupled to the transmit port of the first transceiver, wherein the transmit port of the third transceiver is coupled to the intrusion detection device via a secure data connection. In another further embodiment, the message handler comprises a bus controller.

In one embodiment, the common bus is a controller area network (CAN) bus. In another embodiment, in the event that the received message is not determined to be valid by the intrusion detection device, the intrusion detection device is arranged to output an alert message.

In one independent embodiment, a system for providing protection for devices on a common bus is provided, the system comprising: an input port for connection to an unsecured device, the input port arranged to receive a message from the unsecured device; a bus control device arranged between the input port and the common bus, the bus control device arranged to: output a copy of the received message over a secure channel to an intrusion detection device coupled to the common bus, the intrusion detection device arranged to receive the message copy and determine the validity of the received message responsive to the received message copy.

In one embodiment, the bus control device is arranged to alternately operate in one of a detection mode and a prevention mode, responsive to a received control signal, wherein in the detection mode the bus control device is arranged to output the received message onto the common bus and in the prevention mode the bus control device is arranged to not output the received message onto the common bus. In one further embodiment, in the prevention mode, the intrusion detection device is arranged to output the received message onto the common bus In another embodiment, the bus control device comprises: a first, a second and a third transceivers; a message handler, each of the first, second and third transceivers responsive to the message handler, a receive port of the first transceiver coupled to the input port, a transmit port of the second transceiver coupled to the common bus, a transmit port of the first transceiver coupled to a receive port of the second transceiver and to a receive port of the third transceiver, wherein the message handler is arranged to output the message copy on a transmit port of the third transceiver responsive to the received message. In one further embodiment, the message handler comprises a bus controller.

In one embodiment, the common bus is a controller area network (CAN) bus. In another embodiment, in the event that the received message is not determined to be valid by the intrusion detection device, the intrusion detection device is arranged to output an alert message.

In another independent embodiment, a method of intrusion protection for a common bus is provided, the method comprising: receiving a message from an unsecured device; producing a notification message responsive to the received message, the notification message comprising information about the received message and different from the received message; outputting the notification message; receiving the notification message at an intrusion detection device coupled to the common bus; determining the validity of the received message, by the intrusion detection device, responsive to the received notification message; and in the event that the received message is determined not to be valid, outputting an alert message.

In one embodiment, the method further comprises: changing at least one bit of the received message to create the notification message. In one further embodiment, the one bit is changed in an identification field of the received message.

In another embodiment, the notification message contains sufficient information such that in the event the intrusion detection device determines that the received message is valid, the method further comprising: recreating the received message based on the received notification message; and outputting the recreated received message on the common bus.

In one embodiment, the method further comprises outputting the received message onto the common bus. In another embodiment, the method further comprises: controllably operating in in one of a detection mode and a prevention mode, wherein when operating in the detection mode the method further comprises outputting the received message onto the common bus and when operating in the prevention mode not outputting the received message onto the common bus.

In one embodiment, the outputting of the notification message is onto the common bus. In another embodiment, the outputting of the notification message is to the intrusion detection device via a secure data connection.

In one independent embodiment, a method of intrusion protection for a common bus is provided, the method comprising: receiving a message from an unsecured device; outputting a copy of the received message over a secure channel to an intrusion detection device coupled to the common bus; determining the validity of the received message, by the intrusion detection device, responsive to the received message copy; and in the event that the received message is determined not to be valid, outputting an alert message.

In one embodiment, the method further comprises: selectably operating in one of a first mode and a second mode, wherein in the first mode the method comprises outputting the received message onto the common bus, and wherein in the second mode the received message is not outputted onto the common bus. In one further embodiment, the method further comprises in the second mode: in the event that the received message is determined not to be valid, outputting, by the intrusion detection device, the received message onto the common bus.

Advantageously, the present embodiments provide for a bus control device which in a detection mode allows the passage of messages to the bus without interference. Thus, in the event of error, messages are not interrupted. Further advantageously, an instance of the present bus control device can be implemented for each new unsecured device added to the bus.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice. In the accompanying drawings.

DETAILED DESCRIPTION OF THE PREFERRED EMBODIMENTS

Figure 1A:
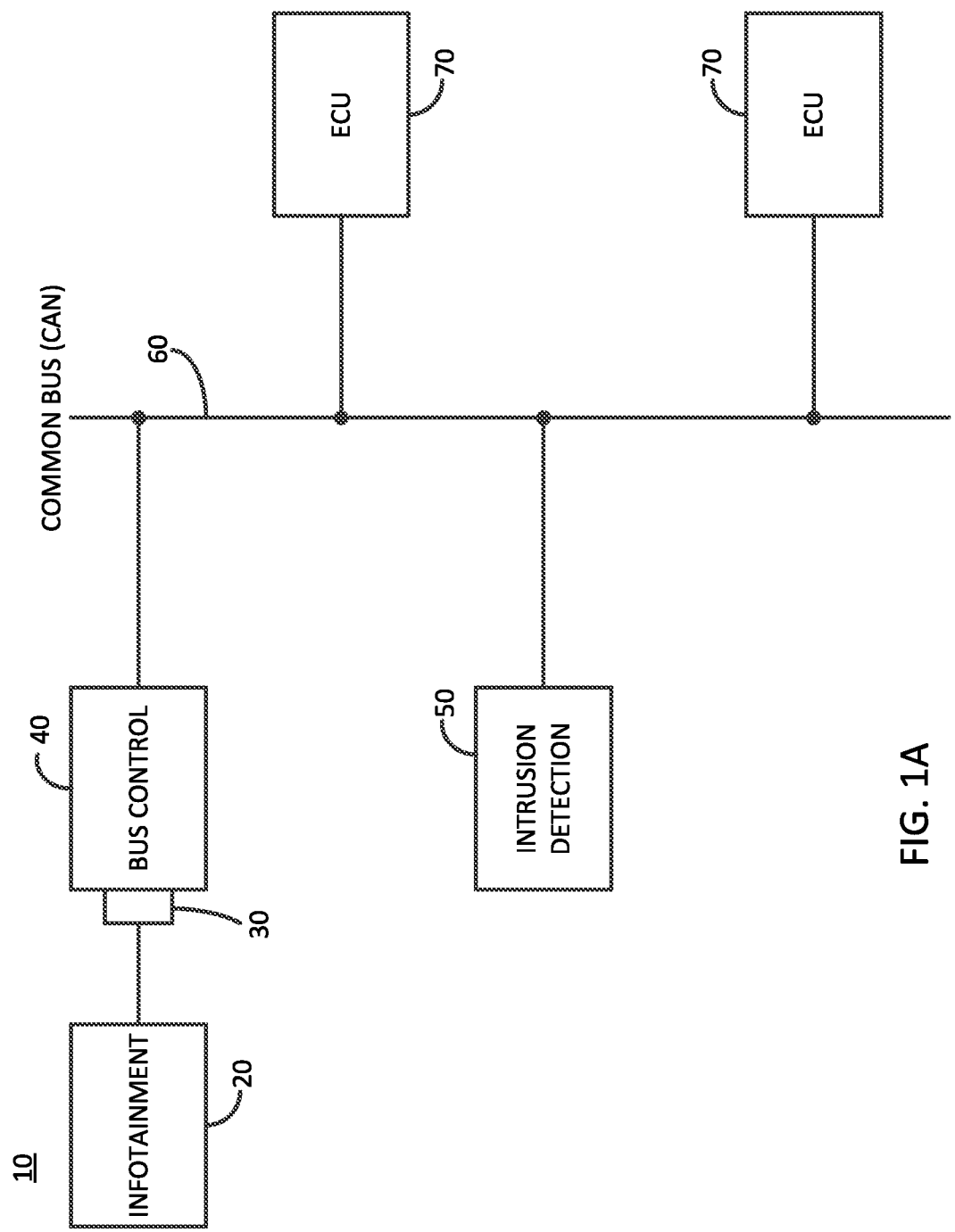
FIG. 1A illustrates a high level block diagram of a first embodiment of a system arranged to provide protection for devices on a common bus.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Various embodiments are described herein in relation to a CAN bus, however this is not meant to be limiting in any way, the embodiments herein are equally applicable to any bus architecture. The embodiments herein are described in relation to an unsecured device being an infotainment system, however this is not meant to be limiting in any way. For example, it is envisioned that in the future a direct Internet connection module may be provided for updating vehicle software, and such an Internet connection module may be considered an unsecured device. Similarly, an ODB2 (on-board diagnostics V2) connection may expose the vehicle to an unsecured device.

Figure 1B:
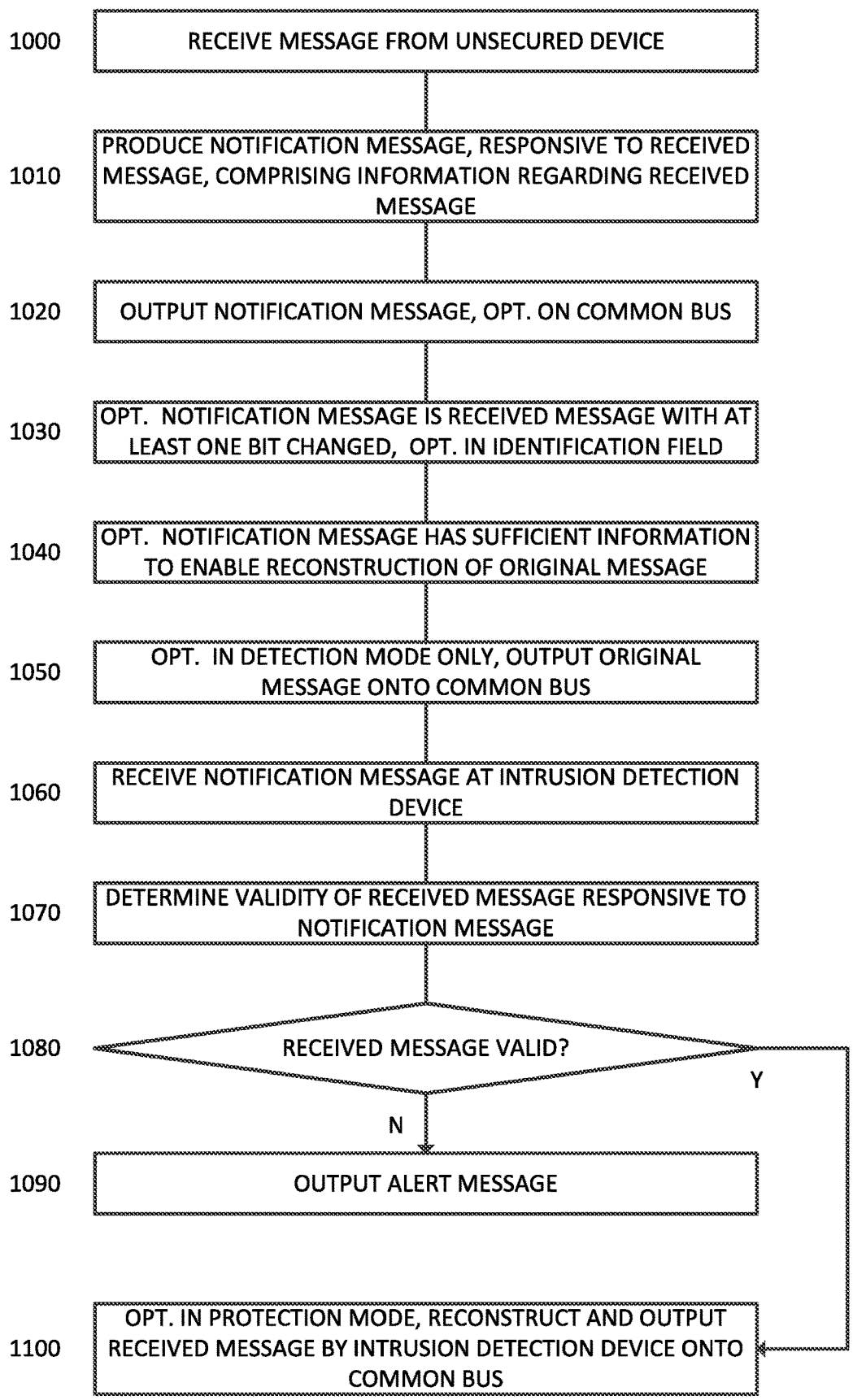
FIG. 1B illustrates a high level flow chart of the operation of the system of FIG. 1A.

FIG. 1A illustrates a high level block diagram of a first embodiment of a system 10 arranged to provide protection for devices on a common bus, and FIG. 1B illustrates a high level flow chart of the operation of system 10, FIGS. 1A and 1B being described herein together for simplicity. System 10 comprises: an unsecured device 20, illustrated without limitation as an infotainment system; an input port 30; a bus control device 40; an intrusion detection device 50; a common bus 60, such as a CAN bus; and a plurality of electronic control units (ECU) 70. Unsecured device 20 is connected to input port 30, and input port 30 is connected to a first port of bus control device 40. It is to be noted that unsecured device 20 is not directly connected to common bus 60. A second port of bus control device 40, a port of intrusion detection device 50 and a port of each ECU 70 is connected to common bus 60. Input port 30 is in one embodiment a connection device arranged for receipt of a cable from unsecured device 20. In one non-limiting embodiment, input port 30 and bus control device 40 are implemented within a connector body. In one non-limiting embodiment bus control device 40 and intrusion detection device 50 are placed physically adjacent, optionally within a single enclosure.

Optionally, a secure connection (not shown) is provided to intrusion detection device 50 to provide for update of the contents of intrusion detection device 50. In one embodiment an on-board diagnostics (OBD) connection is utilized to securely connect to intrusion detection device 50 in order to enable software/firmware updates. In one particular embodiment, a coupler meeting the SAE J1962 specification is utilized to arrange for a secure connection to intrusion detection device 50.

In one embodiment, the functionality of each of bus control device 40 and intrusion detection device 50 may be implemented by one of an FPGA, controller or processor without exceeding the invention. In one particular embodiment each, or any one, of bus control device 40 and intrusion detection device 50 may comprise a processor and on board memory, the functionality accomplished by the processor responsive to reading processor readable instructions stored on the associated memory.

In operation, as shown at stage 1000, a message is received from unsecured device 20 at input port 30 of bus control device 40. At stage 1010, bus control device 40, responsive to the received message at input port 30, produces a notification message, the notification message comprising information regarding the received message.

At state 1020, the produced notification message of stage 1010 is output. Optionally, the notification message is output onto common bus 60, which as indicated above may be a CAN bus. In alternative embodiment, described further hereinto below, the notification message may be output on a secure connection to intrusion detection device 50. There is no limitation as to the notification message, and a plurality of messages may be received prior to sending a notification message.

Optionally, at stage 1030, the notification message is the received message of stage 1000 with at least one bit changed, which is called herein a modified message. Further optionally, the changed bit is in the identification field, which functions in a CAN bus to identify the message target, or addressee. Changing the identification bit effectively ensures that the target device of the received message of stage 1000 does not act upon the notification message. Preferably the changed identification bit, or bits, ensures that intrusion detection device 50 is the target of the modified message and no other devices coupled to common bus 60 will react to the modified message. In one further embodiment the original identification information is further encoded in a spare bit of the notification message so as to enable intrusion detection device 50 to determine the original message target.

Optionally, at stage 1040, the notification message has sufficient information to enable intrusion detection device 50 to completely reconstruct the original received message of stage 1000. It is to be understood that in order to enable intrusion detection device 50 to completely reconstruct the received message of stage 1000, a plurality of notification messages may be required, without exceeding the scope. The notification message is not limited to the size of a single message as defined by the protocol of common bus 60, and may be comprised of multiple common bus messages without exceeding the scope.

In one embodiment, as described at stage 1050, bus control device 40 is operable in one of two modes, responsive to a received control signal. In one embodiment (not shown) the control signal is provided by intrusion detection device 50 over a dedicated channel. In another embodiment, a hardware or software flag is set within bus control device 40 at manufacture to determine the mode of operation.

Alternatively, a switch or jumper may be set to determine the mode of operation. In yet another embodiment, a dedicated connection, such as OBD connection is provided to bus control device to enable setting a hardware or firmware flag of bus control device 40.

In a first mode, also known as the detection mode, bus control device 40 is arranged to output the received message of stage 1000 onto common bus 60 in addition to preparing and outputting the notification message of stage 1020. In a second mode, also known as the prevention mode, bus control device 40 is arranged to not output the received message of stage 1000 onto common bus 60, i.e. it blocks the received message from appearing onto common bus 60, and is arranged to prepare and output the notification message of stage 1020, which as indicated above in stages 1020-1030 may in certain embodiments be output onto the common bus with a change in identification so that the addressee of the received message of stage 1000 does not act on the received message.

In stage 1060, the notification message of stage 1020, is received at intrusion detection device 50. As indicated in stage 1020, the notification message is optionally received by intrusion detection device 50 over common bus 60, or over a dedicated connection.

In stage 1070, intrusion detection device 50 is arranged to determine validity of the received message of stage 1000 responsive to the received notification message. In one non-limiting example, intrusion detection device 50 may have a range of acceptable addresses for messages from unsecured device 20, and intrusion detection device 50 may be arranged to determine the validity of the received message responsive to the contents of the identification field of the original received message of stage 1000.

In stage 1080, a decision is made by intrusion detection device 50 regarding the validity of the received message of stage 1000. In the event that in stage 1080 the receive message of stage 1000 is determined not to be valid, in stage 1090 an alert message is output by intrusion detection device 50 indicative of a security breach. The alert message may be sent to a warning device observable by an operator, and/or transmitted by a secured device to a security station remote from the vehicle, stored in an on-board memory of intrusion detection device 50 or transmitted to another device connected to common bus 60 which is arranged to transmit the alert message to a remote alert message handling site. It is to be understood that the alert message may comprise a plurality of messages, or a single message whose length is greater than that of a standard common bus message size, without exceeding the scope. In one embodiment a predetermined history of messages are output as part of the alert message. Intrusion detection device 50 preferably does not attempt to reconstruct the original received message of stage 1000, and does not output such a reconstructed message onto common bus 60. It is to be noted that in the event that in stage 1050 bus control device 40 was set to prevention mode, the original received message of stage 1000 is thus not output onto common bus 60 by either bus control device 40 or intrusion detection device 50, and thus will not be acted upon by any devices coupled to common bus 60.

In the event that in stage 1080 the receive message of stage 1000 is determined to be valid in stage 1100, assuming that operation is in detection mode, as described above in relation to stage 1050, the received valid message has been output onto common bus 60 and thus no further action is required. In the event that in stage 1050 operation is in prevention mode, and thus the received message has not been output onto common bus 60 by bus control device 40, in stage 1100 intrusion detection device 50 is arranged to reconstruct the original received message of stage 1000 and output the reconstructed message onto common bus 60. Thus, a valid message is received by the target device via common bus 60 responsive to the reconstruction of stage 1100.

Figure 2A:
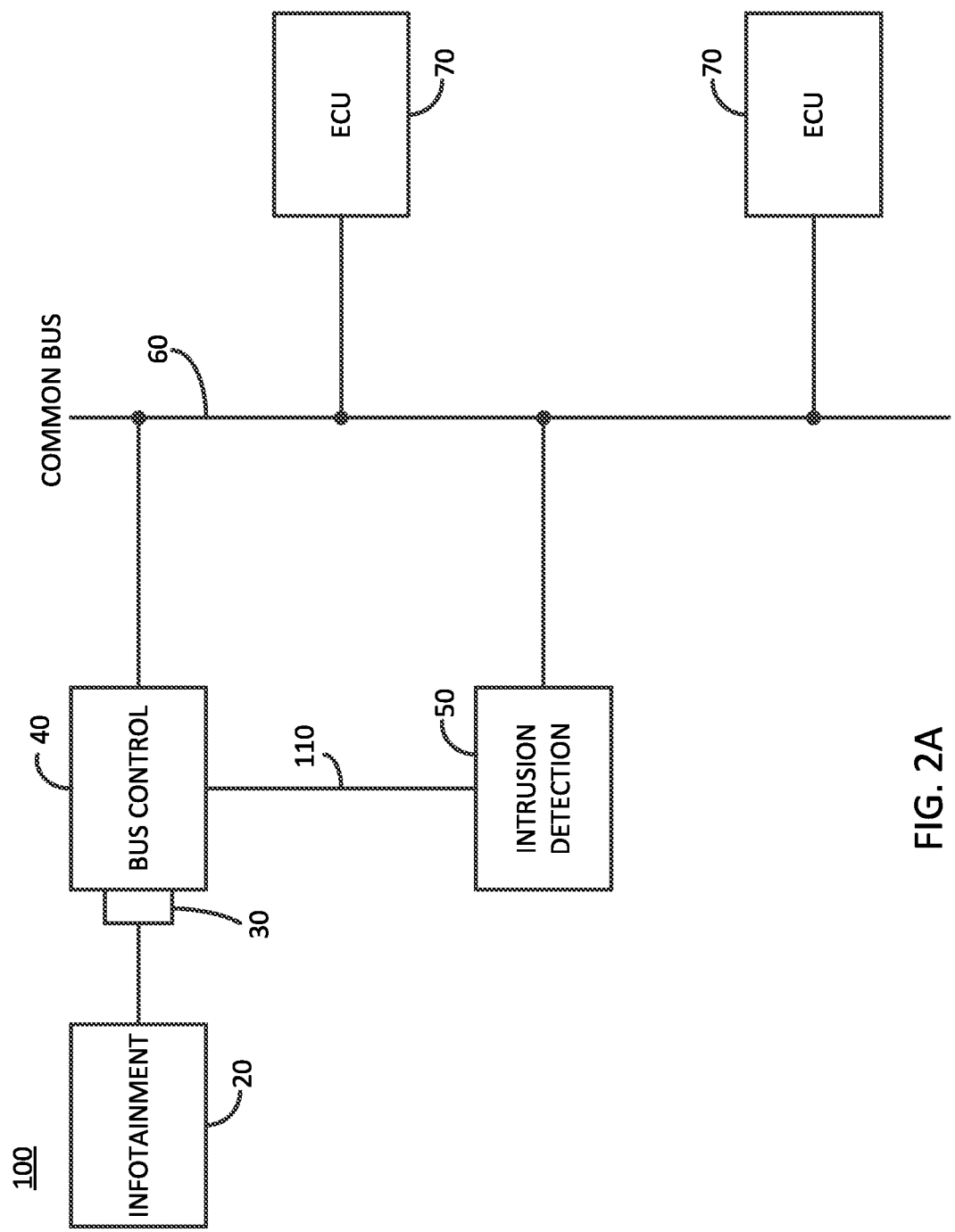
FIG. 2A illustrates a high level block diagram of a second embodiment of a system arranged to provide protection for devices on a common bus.
Figure 2B:
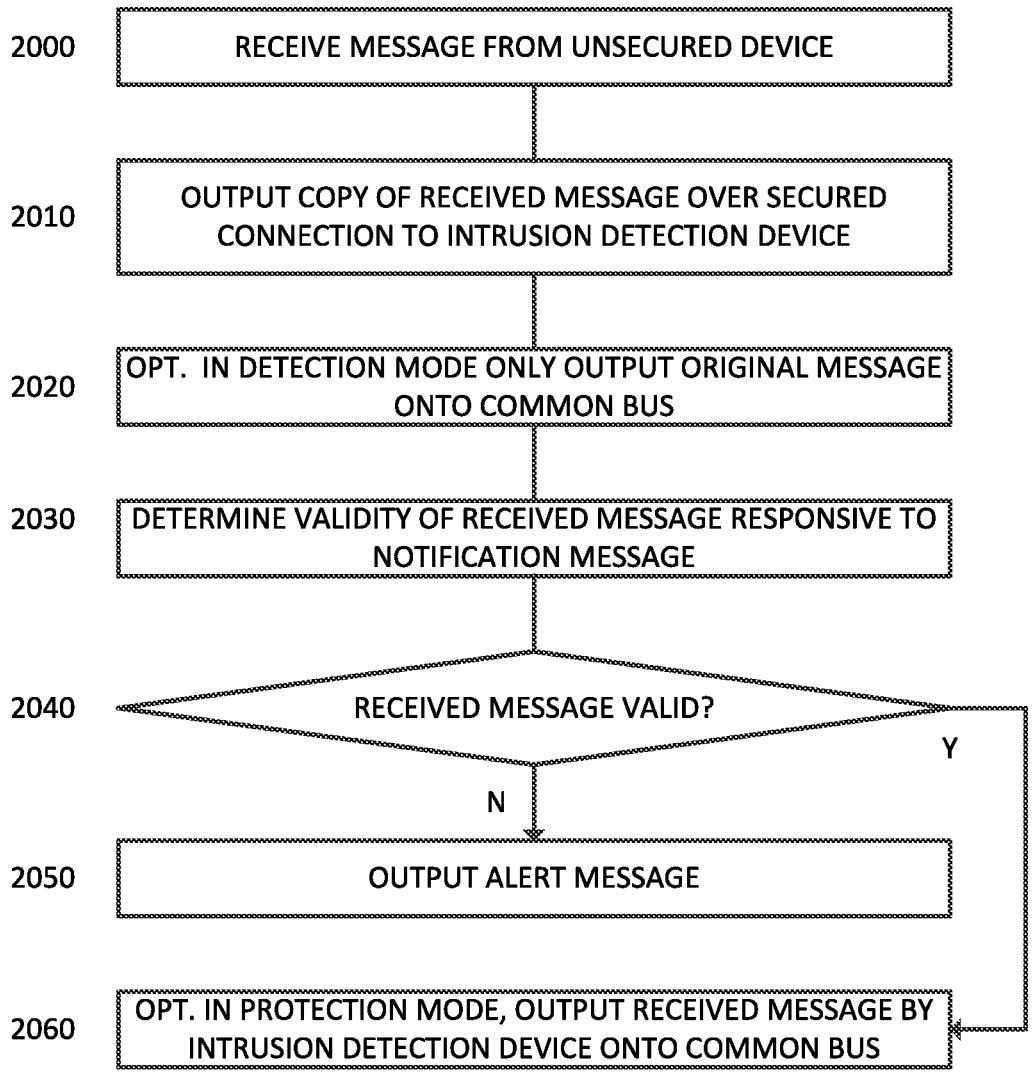
FIG. 2B illustrates a high level flow chart of the operation of the system of FIG. 2A.

FIG. 2A illustrates a high level block diagram of a first embodiment of a system 100 arranged to provide protection for devices on a common bus, and FIG. 2B illustrates a high level flow chart of the operation of system 100, FIGS. 2A and 2B being described herein together for simplicity. System 100 comprises: an unsecured device 20, illustrated without limitation as an infotainment system; an input port 30; a bus control device 40; an intrusion detection device 50; a common bus 60, such as a CAN bus; a plurality of electronic control units (ECU) 70; and a secured connection 110. Unsecured device 20 is connected to input port 30, and input port 30 is connected to a first port of bus control device 40. It is to be noted that unsecured device 20 is not directly connected to common bus 60. A second port of bus control device 40, a port of intrusion detection device 50 and a port of each ECU 70 is connected to common bus 60. Secured connection 110 may be a dedicated connection between bus control device 40 and intrusion detection device 50, or may be part of a secured bus. In one non-limiting embodiment, a plurality of bus control devices 40 are provided coupled to a single intrusion detection device 50 over a secured bus implementation of secured connection 110. Secured connection 110 is considered secure by dint of not being accessible by unsecured device 20.

Input port 30 is in one embodiment a connection device arranged for receipt of a cable from unsecured device 20. In one non-limiting embodiment, input port 30 and bus control device 40 are implemented within a connector body.

Optionally, a secure connection (not shown) is provided to intrusion detection device 50 to provide for update of the contents of intrusion detection device 50. In one embodiment an OBD connection is utilized to securely connect to intrusion detection device 50 in order to enable software/firmware updates. In one particular embodiment, a coupler meeting the SAE J1962 specification is utilized to arrange for a secure connection to intrusion detection device 50.

In one embodiment, the functionality of each of bus control device 40 and intrusion detection device 50 may be implemented by one of an FPGA, controller or processor without exceeding the invention. In one particular embodiment each, or any one, of bus control device 40 and intrusion detection device 50 may comprise a processor and on board memory, the functionality accomplished by the processor responsive to reading processor readable instructions stored on the associated memory.

In operation, as shown at stage 2000, a message is received from unsecured device 20 at input port 30 of bus control device 40. At stage 2010, bus control device 40, responsive to the received message at input port 30, outputs a copy of the received message to intrusion device 50 over secured connection 110. It is to be understood that outputting the received message may be in an encoded or encapsulated form without exceeding the scope. There is no limitation as to the notification message, and a plurality of messages may be received prior to sending a notification message. Thus, the message format may be modified or reorganized, without losing any data of the received message of stage 2000, without exceeding the scope.

In one embodiment, as described at stage 2020, bus control device 40 is operable in one of two modes, responsive to a received control signal. In one embodiment (not shown) the control signal is provided by intrusion detection device 50 over a dedicated channel, which may be secured connection 110 or an additional channel. In another embodiment, a hardware or firmware flag is set within bus control device 40 at manufacture to determine the mode of operation. Alternatively, a switch or jumper may be set to determine the mode of operation. In yet another embodiment, a dedicated connection, such as OBD connection is provided to bus control device to enable setting a hardware or firmware flag of bus control device 40.

In a first mode, also known as the detection mode, bus control device 40 is arranged to output the received message of stage 2000 onto common bus 60 in addition to preparing and outputting the message copy of stage 2010. In a second mode, also known as the prevention mode, bus control device 40 is arranged to not output the received message of stage 2000 onto common bus 60, and is arranged to only output the message copy on secured connection 110 as described in stage 2010. Thus, in the first mode, the message is passed onto common bus 60 and may be received, and acted upon, by the addressee, whereas in the second mode, the message is sent to intrusion detection device 50 over secured connection 110 and is not passed onto common bus 60 by bus control device 40.

In stage 2030, intrusion detection device 50 is arranged to determine validity of the received message of stage 1000 responsive to the received message copy. In one non-limiting example, intrusion detection device 50 may have a range of acceptable addressees for messages from unsecured device 20, and intrusion detection device 50 may be arranged to determine the validity of the received message responsive to the contents of the identification field of the original received message of stage 2000.

In stage 2040, a decision is made by intrusion detection device 50 regarding the validity of the received message of stage 2000. In the event that in stage 2040 the receive message of stage 2000 is determined not to be valid, in stage 2050 an alert message is output by intrusion detection device 50 indicative of a security breach. The alert message may be sent to a warning device observable by an operator, and/or transmitted by a secured device to a security station remote from the vehicle, stored in an on-board memory of intrusion detection device 50, or transmitted to another device connected to common bus 60 which is arranged to transmit the alert message to a remote alert message handling site. It is to be understood that the alert message may comprise a plurality of messages, or a single message whose length is greater than that of a standard common bus message size, without exceeding the scope. In one embodiment a predetermined history of messages are output as part of the alert message. Intrusion detection device 50 preferably does not output the received message of stage 2000 onto common bus 60. It is to be noted that in the event that in stage 2020 bus control device 40 was set to prevention mode, the original received message of stage 2000 is thus not output onto common bus 60 by either bus control device 40 or intrusion detection device 50, and thus will not be acted upon by any devices coupled to common bus 60.

In the event that in stage 2040 the receive message of stage 2000 is determined to be valid, in stage 2060, assuming that operation is in detection mode, as described above in relation to stage 2020, the received valid message has been output onto common bus 60 and thus no further action is required. In the event that in stage 2020 operation is in prevention mode, and thus the received message has not been output onto common bus 60 by bus control device 40, in stage 2060 intrusion detection device 50 is arranged to output the original received message of stage 2000 onto common bus 60. In the event that in stage 2010 the message has been modified, stage 2060 further provides for reconstructing the original received message of stage 2000. Thus, a valid message is received by the target device via common bus 60 responsive to stage 2060 performed by intrusion detection device 50.

Figure 3:
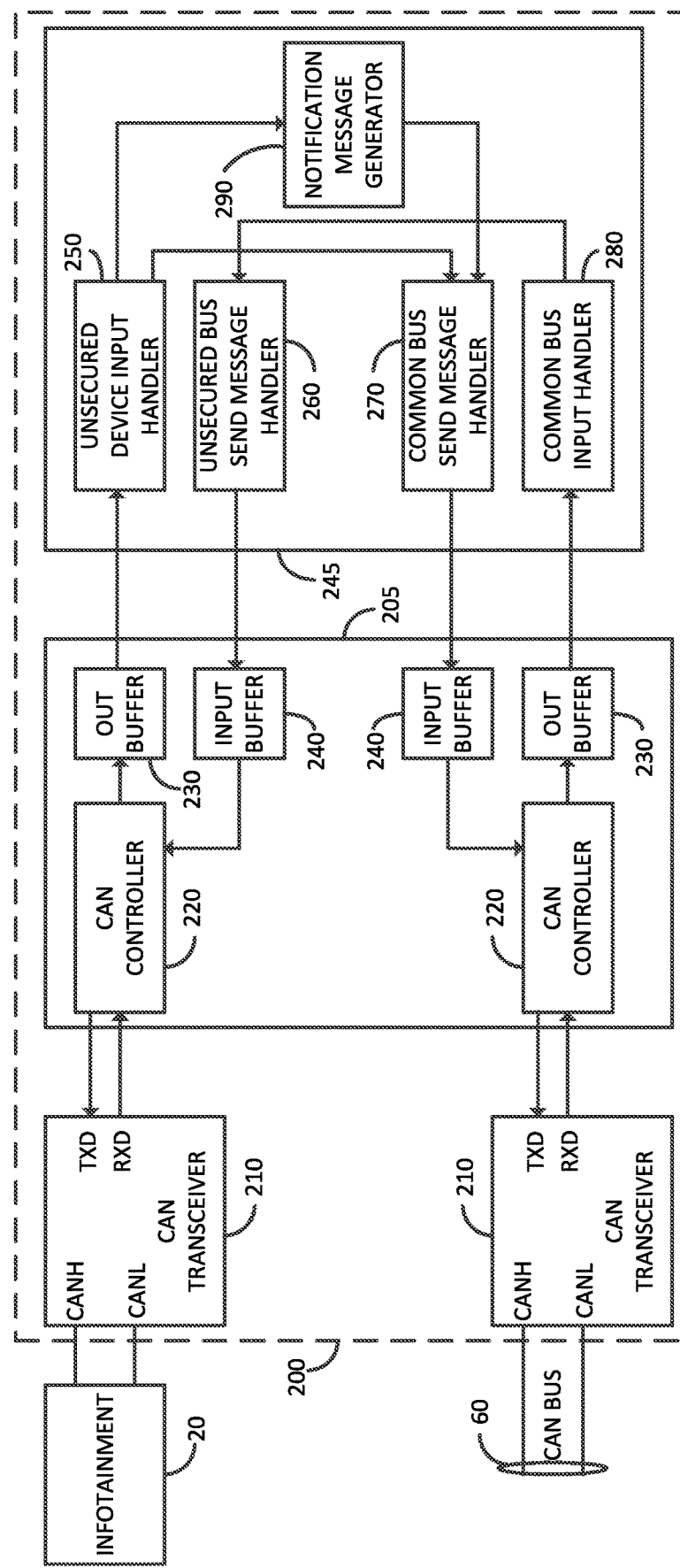
FIG. 3 illustrates an embodiment of a bus control device wherein received messages are output on the common bus, and a notification message is produced and output onto the common bus.

FIG. 3 illustrates an embodiment of a bus control device 200 wherein received messages are output on the common bus, and a notification message is produced and output onto the common bus. Bus control device 200 comprises: a first and a second CAN transceiver 210; a communication stack 205; and a middleware 245. Communication stack 205 comprises: a first and second CAN controller 220; a first and a second output buffer 230; and a first and a second input buffer 240. Middleware 245 comprises: an unsecured device input handler 250; a unsecured bus send message handler 260; a common bus send message handler 270; a common bus input handler 280; and an notification message generator 290. Each of communication stack 205 and middleware 245 may be implemented by a processor executed non-transitory electronically readable instructions stored on a memory associated therewith, by dedicated hardware, or by programmable hardware, such as an FPGA without exceeding the scope.

Unsecured device 20 is coupled to the CANH and CANL inputs of first CAN transceiver 20, the termination devices are not shown for simplicity. TXD and RXD ports of first CAN transceiver 210 are connected to respective ports of first CAN controller 220. An output of first CAN controller 220 is connected to an input of first output buffer 230 and an output of first input buffer 240 is connected to an input of first CAN controller 220.

An output of first output buffer 230 is connected to an input of unsecured device input handler 250, a first output of unsecured device input handler 250 is connected to an input of notification message generator 290 and a second output of unsecured device input handler 250 to a first input of common bus send message handler 270. An output of notification message generator 290 is connected to an input of common bus message handler 270. An output of common bus message handler 270 is connected to an input of second input buffer 240 and an input of common bus input handler 280 is connected to an output of second output buffer 230. An output of common bus handler 280 is connected to an input of send unsecured bus message handler 260.

An output of second input buffer 240 is connected to an input of second CAN controller 220 and an output of second CAN controller 220 is connected to an input of second output buffer 230. Respective ports of second CAN controller 220 are connected to TXD and RXD ports of second CAN transceiver 210, and CANH and CANL ports of second CAN transceiver 210 are connected to respective ports of CAN bus 60.

In operation, bus control device 200 operates as described above in relation to FIGS. 1A-1B. In particular, message received from unsecured device 20 are passed by first CAN transceiver 210 via first CAN controller 220 and first output buffer 230 to unsecured device input handler 250. Unsecured device input handler 250 outputs the received message both to common bus send message handler 270, thus ensuring that the received message is output onto common bus 60, as described above in relation to detection mode of stage 1050, and an additional copy is output to notification message generator 290. Advantageously, in the event of an error condition for bus control device 200, received messages from unsecured device 20 continue to be passed to common bus 60 without hindrance since notification message generator 290, wherein the majority of the logic is disposed, is not involved in the passing of messages. Notification message generation 290 operates as described above to generate a notification message for transmission over common bus 60 to intrusion detection device 50. Both the notification message and the received message are processed by common bus message handler 270, transmitted via second input buffer 240 onto CAN bus 60 via second CAN controller 220 and second CAN transceiver 210. Messages from device connected to CAN bus 60 which address unsecured device 20 are similarly passed without hindrance via second CAN transceiver 210 to second CAN controller 220, and via second output buffer 230 to common bus input handler 280. Common bus input handler 280 passes the message to unsecured bus send message handler 260 which outputs the message via first input buffer 240 to first CAN controller 220. First CAN controller 220 transmits the message to unsecured device 20 via first CAN transceiver 210.

Figure 4:
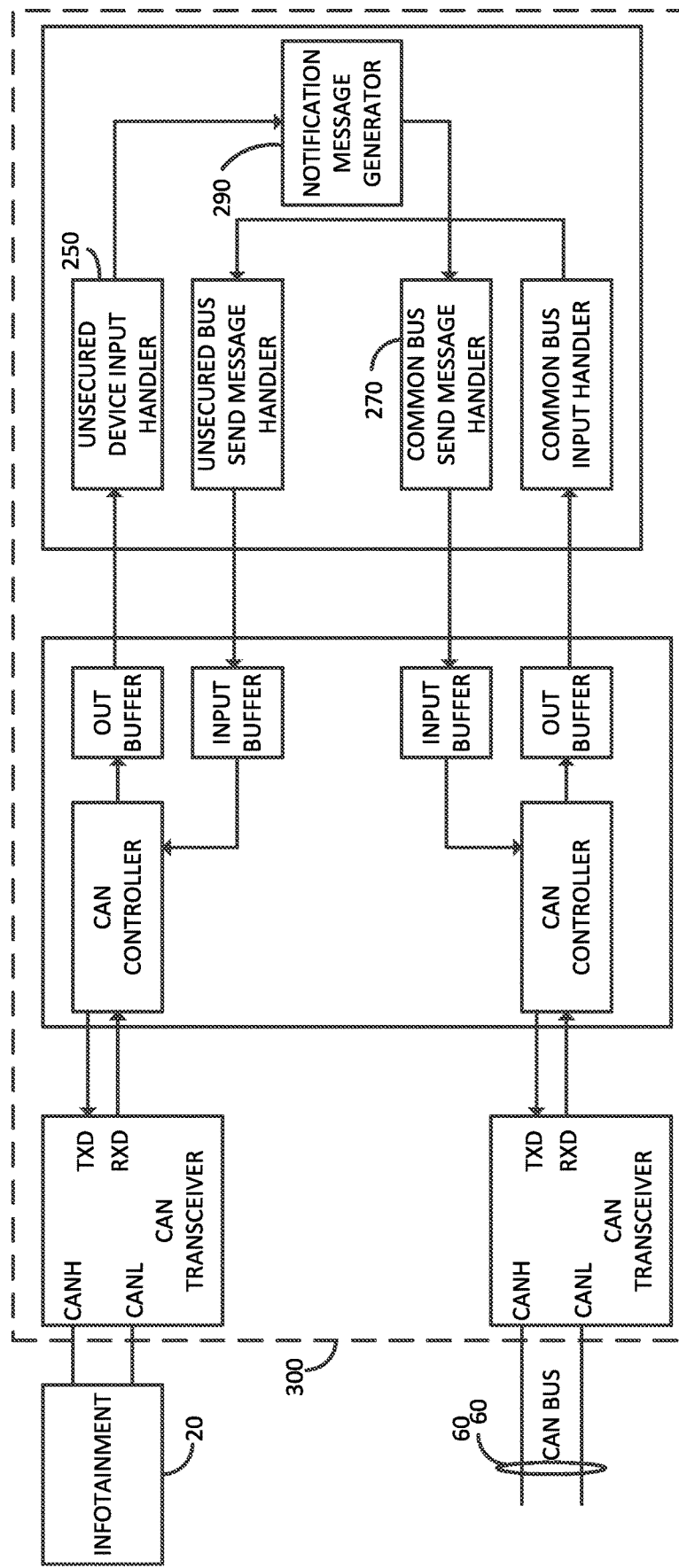
FIG. 4 illustrates an embodiment of a bus control device wherein received messages are not output on the common bus, and a notification message is produced and output onto the common bus.

FIG. 4 illustrates an embodiment of a bus control device 300 wherein received messages are not output on the common bus, and a notification message is produced and output onto the common bus. Bus control device 300 is in all respects similar to bus control device 200 with the exception that unsecured device input handler 250 is arranged to output messages received from unsecured device 20 to notification message generator 290 without sending an additional copy directly to common bus send message handler 270. Thus only the notification message is processed by common bus message handler 270 and ultimately output onto CAN bus 60. As described above, bus control device 200 and bus control device 300 may thus represent a single programmable device, wherein bus control device 200 represents operation in the first, or detection mode, and bus control device 300 represents operation in the second, or prevention, mode.

Figure 5:
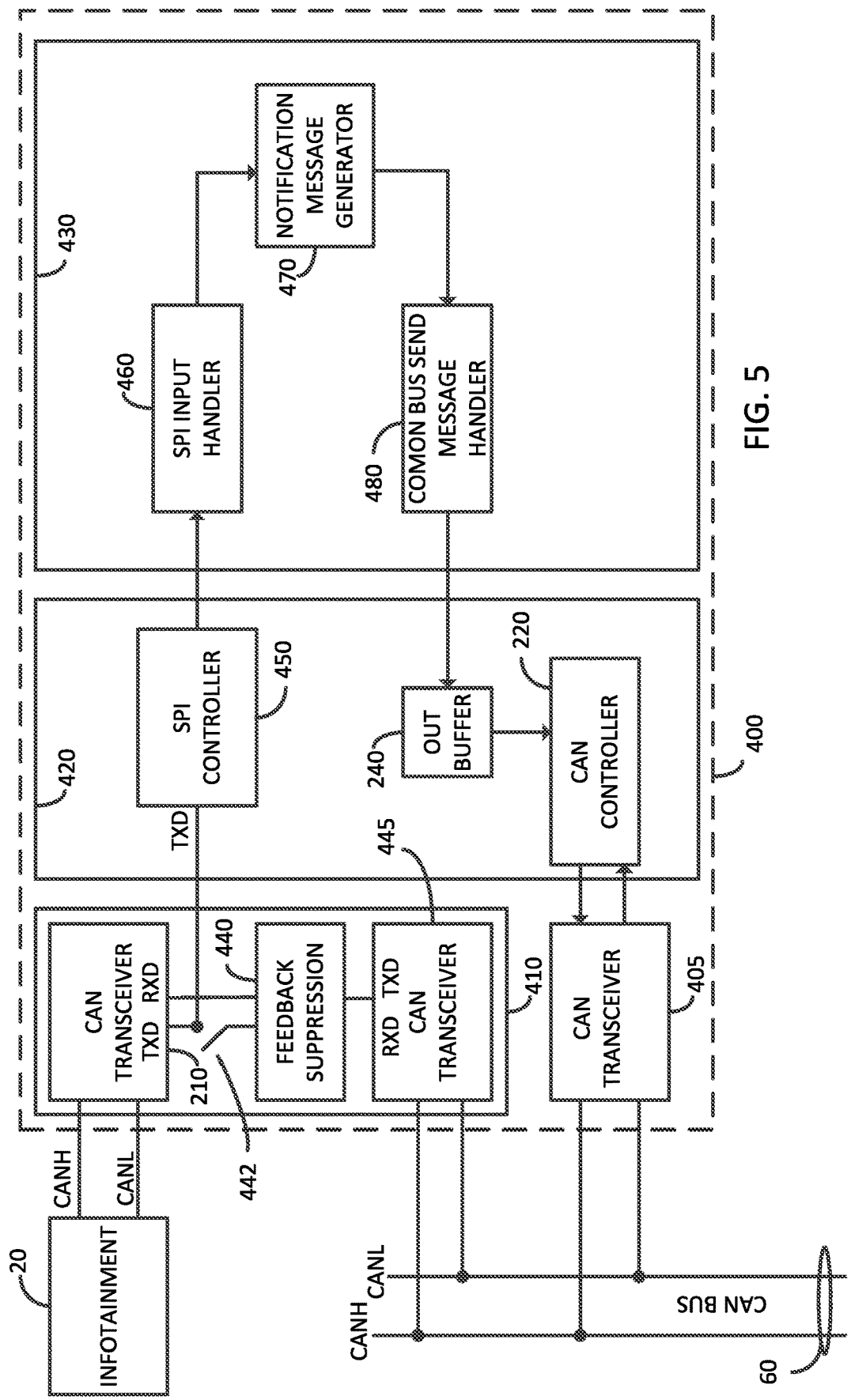
FIG. 5 illustrates an embodiment of a bus control device comprising a one way repeater and operating under an SPI protocol.

FIG. 5 illustrates an embodiment of a bus control device 400 comprising a one way repeater 410, a first CAN transceiver 405, a communication stack 420 and a middleware 430. Each of one way repeater 410, communication stack 420 and middleware 430 may be implemented by a processor executed non-transitory electronically readable instructions stored on a memory associated therewith, by dedicated hardware, or by programmable hardware, such as an FPGA without exceeding the scope. CAN bus 60 and unsecured device are further illustrated for clarity. One way repeater 410 comprises a second and a third CAN transceiver 210, a switch 442, and a feedback suppression circuit 440. Communication stack 420 comprises an SPI controller 450, and input buffer 240 and a CAN controller 220. Middleware 430 comprises an SPI input handler 460, a notification message generator 470 and a common bus send message handler 480. Bus control device 400 is advantageously arranged such that even in the event of an error condition of bus control device 40, received messages from unsecured device 20 continue to be passed to common bus 60 without hindrance. Communication stack 420 is illustrated as operating via an SPI controller, however it is to be understood that this is meant to be an illustration and is not meant to be limiting. Thus, for example, an I²C protocol and controller may be substituted for the SPI communication protocol without exceeding the scope.

Unsecured device 20, illustrated without limitation as infotainment device 20, is connected via CANH and CANL lines to second CAN transceiver 210 without one way repeater 410. Second CAN transceiver 210 is connected to third CAN transceiver 445 via feedback suppression circuit 440. The TXD output of second CAN transceiver 210 is connected as an output of one way repeater 410 to an input of SPI controller 450 and is switchable connected via switch 442 to a respective input of feedback suppression circuit 440. The output of SPI controller 450 is connected to the input of SPI input handler 460 and the output of SPI input handler 460 is connected to notification message generator 470. The output of notification message generator 470 is connected to the input of common bus send message handler 480 and the output of common bus send message handler 480 is connected to the input of input buffer 240. The output of input buffer 240 is connected to the input of CAN controller 220, and CAN controller 220 is bidirectionally connected to first CAN transceiver 405. Each of first CAN transceivers 405 and third CAN transceiver 445 are connected to CAN bus 60, i.e. the respective CANH and CANL lines of CAN bus 60. Switch 442 is illustrated as being placed between the TXD output of second CAN transceiver 210 and feedback suppression circuit 440, it being understood that switch 442 can be similarly placed between feedback suppression circuit 440 and the RXD input of third CAN transceiver 445 without exceeding the scope.

Switch 442 may be a mechanical switch, jumper, or an electronically controlled switch without exceeding the scope. In one embodiment, switch 442 is controlled responsive to an RFID tag juxtaposed with bus control device 400. Preferably switch 442 is set to default to a closed position, wherein the first mode, i.e. the detection mode, is automatically enabled. Advantageously, defaulting to detection mode ensures in the event of an error condition for bus control device 400, received messages from unsecured device 20 continue to be passed to common bus 60 without hindrance.

In operation messages from unsecured device 20 are fed to second CAN transceiver 210 under the CAN protocol, and are copied to CAN bus 60 via third CAN transceiver 445, provided that switch 442 is closed. Those skilled in the art of CAN bus will recognize the need for feedback suppression since messages appearing on CAN bus 60 are also fed back via third CAN transceiver 445 towards second CAN transceiver 210. SPI controller 450 is preferably only coupled to the TXD line of second CAN transceiver 210. Due to the presence of feedback suppression circuit 440, the output of the TXD line of second CAN transceiver 210 does not appear on the RXD line of second CAN transceiver 210.

SPI controller 450 thus receives a copy of messages transmitted by infotainment device 20, but preferably does not receive messages transmitted by other devices on CAN bus 60. Messages transmitted by infotainment device 20 are transmitted directly onto CAN bus 60 via one way repeater 410, and messages to infotainment device 20 from CAN bus are similarly passed by one way repeater 410.

SPI controller 450 acts to convert data from the CAN bus physical protocol to an SPI protocol, and transferred the received data to SPI input handler 460 of message stack 430. SPI input handler 460 acts to identify messages in accordance with the CAN protocol, and transfer the identified messages as message blocks to notification message handler 470. Notification message handler 470 is to all extents identical with notification message handler 290, described above, operating however on messages outside of the CAN physical format. Notification message handler 470 generates a notification message, as described above, and transfers it to common bus send message handler 480, which functions to convert the notification message generated by notification message handler 470 to the CAN bus protocol, and transfer the notification message to input buffer 240 for transmission. CAN controller 220 retrieves the notification message from CAN controller 220 and transfers it, under control of CAN controller 220 to first CAN transceiver 405, which acts to output the message in accordance with the physical and electrical requirements of CAN bus 60.

In the event that switch 442 is set to the open state, bus control device 400 is set to the second mode, i.e. the prevention mode, as described above. In particular, messages received from unsecured device 20 are not automatically transferred to common bus 60, but instead are transferred exclusively to notification message handler 470.

Figure 6:
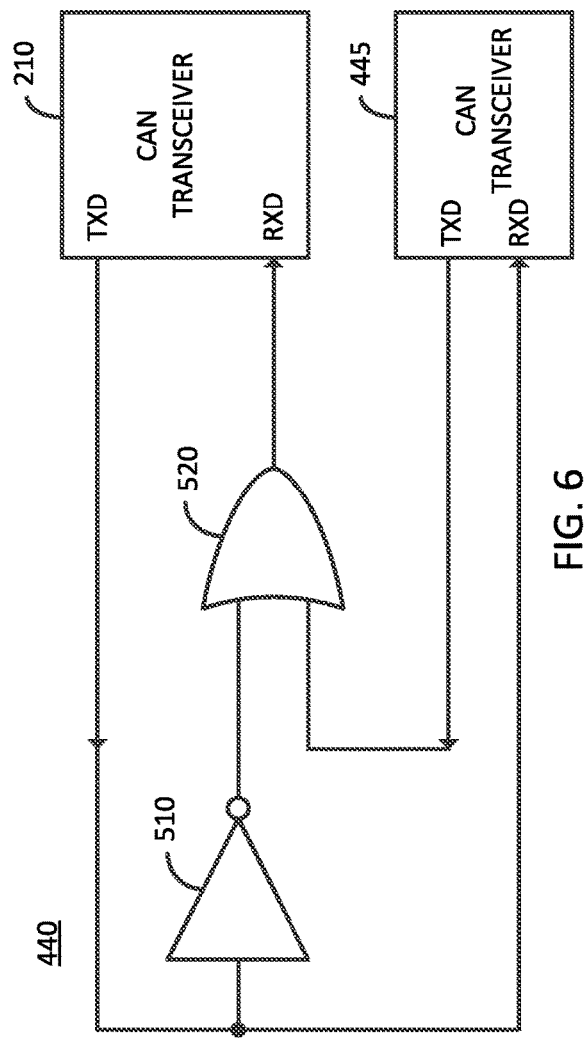
FIG. 6 illustrates a high level circuit diagram of an implementation of feedback suppression circuit.

FIG. 6 illustrates a high level circuit diagram of an implementation of feedback suppression circuit 440, utilizing an inverter 510 and an OR gate 520. The TXD output line of second CAN transceiver 210s connected to the RXD line of third CAN transceiver 445 and to an input of inverter 510. An output of inverter 510 is connected to a first input of OR gate 520 and a second input of OR gate 520 is connected to the TXD line of third CAN transceiver 445. An output of OR gate 520 is connected to the RXD line of second CAN transceiver 210.

In a CAN bus the active signal is a low signal. Thus, when second CAN transceiver 210 outputs an active low signal at its TXD line, its input RXD line is forced to a high level via inverter 510 and OR gate 520, irrespective of the appearance of the echoed low signal on the TXD line of third CAN transceiver 445. When second CAN transceiver 210 is not active, i.e. its TXD line is high, signals from the TXD line of third CAN transceiver 445 appear at the RXD line of second transceiver 210.

Figure 7:
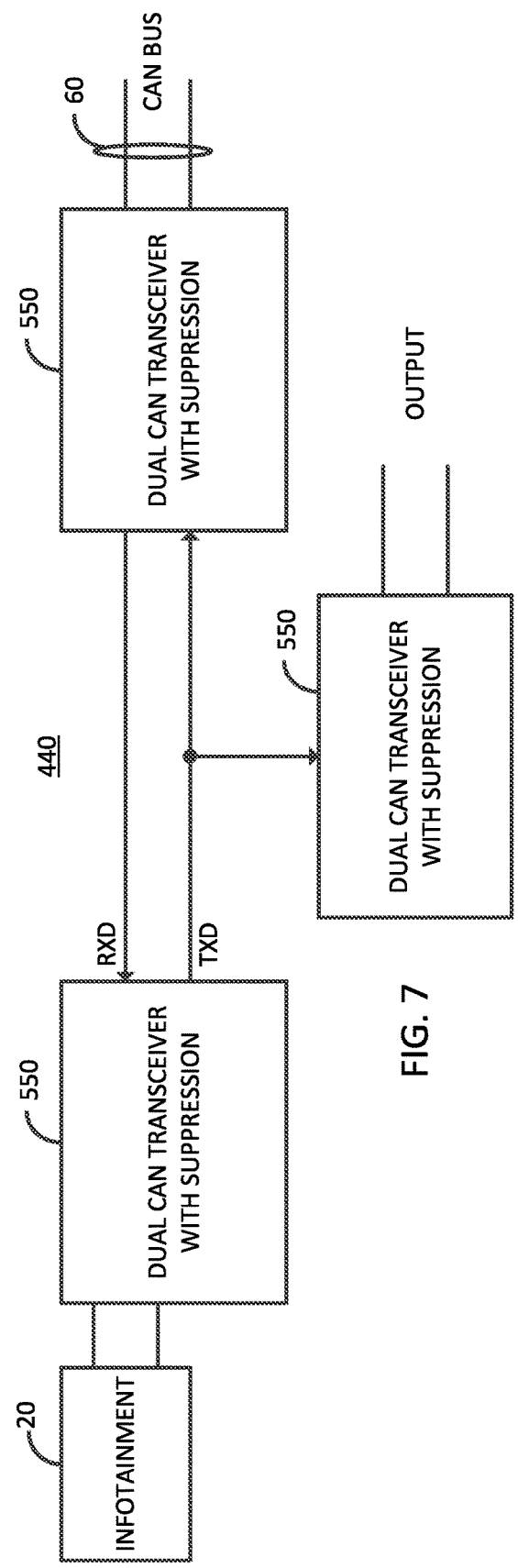
FIG. 7 illustrates an embodiment of a repeater with feedback suppression utilizing Dual-CAN transceivers.

FIG. 7 illustrates an embodiment of a repeater with feedback suppression 440 utilizing a first, second and third dual-CAN transceiver 550. Each dual-CAN transceiver 550 is provided with internal feedback suppression, and is commercially available. A first port of first dual-CAN transceiver 550 is connected to unsecured device 20, and a second port of first dual-CAN transceiver 550 is connected to a first port of second dual-CAN transceiver 550. A second port of second dual-CAN transceiver 550 is connected to CAN bus 60. The TXD port of first dual-CAN transceiver 550 is further connected to the RXD port to third dual-CAN transceiver 550. The second port of third dual-CAN transceiver 550 thus represents a one way repeated output, i.e. the output of the TXD port of first dual-CAN transceiver 550 appears at the second port of third dual-CAN transceiver 550. Feedback suppression is provided internally in commercially available dual-CAN transceivers, and thus need not be separately provided.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A system for providing protection for devices on a common bus, the system comprising:
    an input port for connection to an unsecured device, said input port arranged to receive a message from said unsecured device;
    a bus control device coupled to said input port and the common bus, said bus control device arranged to:
        produce a notification message responsive to said received message, said notification message comprising information about said received message and different from said received message; and
        output said notification message onto the common bus with a target, and
    an intrusion detection device coupled to the common bus, said intrusion detection device arranged to receive said notification message over the common bus and determine the validity of said received message responsive to said received notification message,
    wherein said intrusion detection device is the target of said notification message,
    wherein said bus control device is arranged to produce said notification message by changing at least one bit of said received message to create said notification message, and
    wherein said at least one bit is changed in an identification field of said received message, thereby ensuring that said intrusion detection device coupled to the common bus is the target of said notification message and no other devices coupled to the common bus react to the output notification message.

2. The system of claim 1, wherein said notification message contains sufficient information such that in the event said intrusion detection device determines that said received message is valid, said intrusion detection device is arranged to recreate the received message from said received notification message and output said recreated received message on said common bus.

3. The system according to claim 1, wherein said bus control device is arranged to alternately operate in one of a detection mode and a prevention mode, responsive to a received control signal, wherein in said detection mode said bus control device is arranged to output said received message onto the common bus and in said prevention mode said bus control device is arranged to not output said received message.

4. The system of claim 3, wherein in said prevention mode, said intrusion detection device is arranged to reconstruct said received message based on said notification message and output said reconstructed received message onto said common bus.

5. The system of claim 1, wherein said bus control device comprises:

a first and a second transceiver;

a message handler, each of said first and said second transceivers responsive to said message handler, a receive port of said first transceiver coupled to said input port, a transmit port of said second transceiver coupled to the common bus, a transmit port of said first transceiver coupled to a receive port of said second transceiver, wherein said message handler is arranged to create said notification message.

6. The system of claim 5, wherein said message handler further comprises a feedback suppression circuit arranged to suppress feedback of said output notification message.

7. The system of claim 5, further comprising a third transceiver, a receive port of said third transceiver coupled to the transmit port of said first transceiver, wherein a transmit port of said third transceiver is coupled to the common bus.

8. The system of claim 5, wherein said message handler comprises a bus controller.

9. The system of claim 1, wherein the common bus is a controller area network (CAN) bus.

10. The system of claim 1, wherein and in the event that said received message is not determined to be valid by said intrusion detection device, said intrusion detection device is arranged to output an alert message.

11. The system according to claim 1, wherein the received message targets a target device on the common bus.

12. A method of intrusion protection for a common bus, the method comprising:

receiving a message from an unsecured device;

producing a notification message responsive to said received message, said notification message comprising information about said received message and different from said received message;

changing at least one bit of said received message to create said notification message;

outputting said notification message onto the common bus with a target;

receiving said notification message at an intrusion detection device coupled to the common bus, wherein said intrusion device is the target of said notification message;

determining the validity of said received message, by said intrusion detection device, responsive to said received notification message; and in the event that the received message is determined not to be valid, outputting an alert message, wherein said intrusion detection device is the target of said output notification message, wherein said one bit is changed in an identification field of said received message, thereby ensuring that said intrusion detection device coupled to the common bus is the target of said output notification message and that no other devices coupled to the common bus react to the output notification message.

13. The method according to claim 12, wherein said notification message contains sufficient information such that in the event said intrusion detection device determines that said received message is valid, the method further comprises:

recreating the received message based on said received notification message; and outputting said recreated received message on said common bus.

14. The method according to claim 12, further comprising outputting said received message onto the common bus.

15. The method according to claim 12, further comprising:

controllably operating in in one of a detection mode and a prevention mode, wherein when operating in said detection mode the method further comprises outputting said received message onto the common bus and when operating in said prevention mode not outputting said received message onto the common bus.

16. The method according to claim 12, wherein the received message targets a target device on the common bus.

* * * * *